Sept. 30, 1969  D. H. OHLEMACHER ETAL  3,470,517
THERMOSTAT WITH MANUAL RESET
Filed Oct. 27, 1967

INVENTORS
DAVID H. OHLEMACHER,
& EDWARD G. THEM
BY
McNENNY, FARRINGTON, PEARNE & GORDON

ATTORNEYS

United States Patent Office 3,470,517
Patented Sept. 30, 1969

3,470,517
THERMOSTAT WITH MANUAL RESET
David H. Ohlemacher, Columbus, and Edward G. Them, Mansfield, Ohio, assignors, by mesne assignments, to Therm-O-Disc Incorporated, a corporation of Ohio (1968)
Filed Oct. 27, 1967, Ser. No. 678,690
Int. Cl. H01h 37/70, 37/74
U.S. Cl. 337—348                          7 Claims

ABSTRACT OF THE DISCLOSURE

A manual reset snap disc type thermostat is disclosed which can be manufactured at low cost in small sizes. A pair of similar stationary contacts provide contact portions extending inwardly from opposite sides of a body switch cavity. A bridging contact is operated through a bumper by a bimetallic disc. The discs remains in either position of stability in the normal environmental temperature range and snaps from a first such position to a second position when a predetermined temperature outside such range is reached. A unitary bumper extends through the bridging contact and out of the body to perform the dual functions of operating the switch and also permitting manual reset to return the disc to its first position.

BACKGROUND OF INVENTION

This invention relates generally to snap disc operated thermostats and mort particularly to a novel and improved small, low-cost snap disc thermostat provided with manual reset.

A thermostat incorporating the present invention includes a switch which is operated when a predetermined temperature is reached and which remains in the operated position until the thermostat is manually reset. Generally, in the past, thermostats with manual resets have involved relatively complicated structures and have, therefore, not been practical for manufacture as very small, low-cost devices.

PRIOR ART

The United States Letters Patent to Odson No. 3,219,783 discloses an example of a manual reset thermostat of the type mentioned above. Although thermostats having a structure and mode of operation as disclosed in this patent operate efficiently and accurately, such thermostat arrangements do not lend themselves to be manufactured in very small sizes at low cost. Two other United States Letters Patents to Bolesky No. 2,717,936 and Schmitt No. 3,014,105 disclose thermostats which can be manufactured at low cost in small sizes. However, the thermostats disclosed in the latter two patents do not provide for manual reset. All three of these patents are assigned to the assignee of the present invention.

SUMMARY OF INVENTION

The present invention permits the manufacture of a low-cost, small size thermostat with manual reset. For example, the preferred embodiment has been construed utilizing a bimetallic disc having a diameter of about one-half inch. The overall height of the thermostat is about nine-sixteenths of an inch and the outside diameter of the case is about five-eighths of an inch. The thermostat provides a double break so the switch can terminate flow of relatively high currents without contact deterioration. Such a thermostat is useful in various types of systems and is particularly useful in small, inexpensive coffee makers or the like.

The structure is arranged so that the bumper usually provided to operatively connect the disc and mobile contact element also functions to provide for manual reset. Consequently the manual reset is provided without requiring any additional parts and without requiring any increase in the size of the device. Further, since the number of elements is not increased to provide for manual reset, the cost of manufacturing the parts and assembling the complete device remains substantially unchanged when compared to the cost of similar thermostat without manual reset.

OBJECTS OF INVENTION

It is an important object of this invention to provide a novel and improved small size, low-cost bimetallic disc operated thermostat with manual reset.

It is another important object of this invention to provide a novel and improved thermostat according to the preceding object wherein a single bumper functions to operatively connect the switch and disc, for operating the switch in response to disc movement, and also functions to provide for manual reset.

Further objects and advantages will appear from the following description and drawing wherein.

Figure 1:
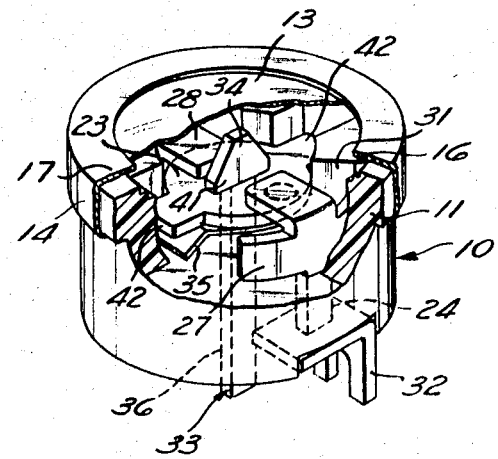
FIGURE 1 is a perspective view of thermostat incorporating this invention with parts broken away for purposes of illustration.

In the illustrated embodiment of the thermostat incorporating this invention, the body 10 is formed of the insulating plastic material and is generally cylindrical in shape. The body provides side walls 11 and an end wall 12. A snap disc 13 formed of bimetallic material is mounted at the open end of the body 10 by a ring shaped case 14. In the illustrated embodiment the body 10 is formed with a circular recess 16 which cooperates with an inwardly extending flange 17 on the case to embrace the periphery of the snap disc 13 and provide radial and axial location of the snap disc. The case 14 is retained on the body 10 by an inturned edge 15.

The body 10 and snap disc 13 cooperate to define a generally cylindrical switch cavity 18 which is symmetrical about a central axis 19. A switch is provided in the cavity 18 which includes a pair of similar fixed contact elements 21 and 22 and a mobile bridging contact element 23. Each of the fixed contact elements 21 and 22 is provided with a stem portion 24 extending through an opening 26 in the end wall 12, a stabilizing section 27 within the chamber 18 and a radially extending contact portion 28.

The stabilizing section 27 (best illustrated in FIGURE 1) is curved to closely fit the inner wall 29 and in the illustrated embodiment engages at its ends axially extending abutments 31 which cooperate with the inner wall 29 to accurately and rigidly lock and fixed contact element against radial movement. The outer end of the stem portion 24 is riveted to an associated terminal 32 so that the switch can be connected to external conductors. The terminals 32 engage the outer surface of the end wall 12 and cooperate with the opposed edges of the stabilizing sections 27 to rigidly support the terminal elements 21 and 22 against axial movement relative to the body.

Figure 2:
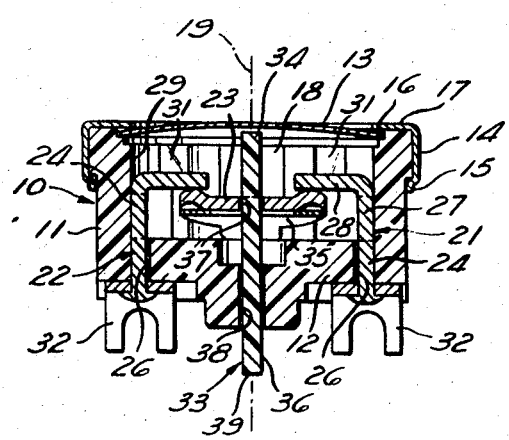
FIGURE 2 is a side elevation in longitudinal section of the thermostat illustrated in FIGURE 1 illustrating the elements in the switch closed position; and, FIGURE 3 is a side elevation in longitudinal section similar to FIGURE 2 illustrating the elements in the switch open position.
Figure 3:
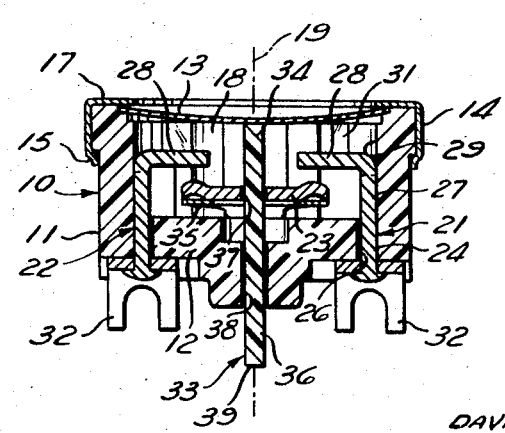

The radial extending portions 28 of the two contact elements 21 and 22 are spaced from each other on opposite sides of the central axis 19. The bridging contact 23 when in the closed position of FIGURE 2 provides electrical connection between the two fixed contact elements 21 and 22 and the switch is closed. The bridging contact 23 is movable to a switch open position as illustrated in FIGURE 3 at which time it is out of engagement with the two contact elements 21 and 22 and the switch is open. A leaf spring 35 is positioned between the end wall 12 and the bridging contact 23 and resiliently urges the bridging contact 23 toward the normally closed position of FIGURE 2.

A bumper 33 is provided with a head portion 34 between the snap disc 13 and the bridging contact 23 and a stem portion 36 of uniform cross section which extends through and closely fits an opening 37 in the bridging contact and an opening 38 in the end wall 12. The stem 36 extends along the axis 19 and is provided with an end portion 39 exteriorally of the body so that the bumper can be pushed axially with respect to the body to reset the snap disc.

The snap disc 13 provides two positions of stability which are illustrated in FIGURES 2 and 3, respectively. The disc is arranged so that it remains in either of the two positions of stability when the temperature of the disc is within a normal ambient temperature range. However, the disc snaps to the position of FIGURE 3 when a predetermined temperature is reached which is outside the normal ambient temperature range. Consequently the thermostat can be used, for example, in an automatic percolator type coffee maker. When such percolator is started, the snap disc is manually set in the position of FIGURE 2 and the switch is closed. When a predetermined temperature is reached, for example, about 180° F. the disc snaps through center to the second position of stability as illustrated in FIGURE 3. The various elements are arranged so that the bumper 33 moves the bridging contact to the open position illustrated in FIGURE 3 against the action of the spring 35. When the disc again returns to normal ambient temperature, the disc remains in the second position of stability of FIGURE 3 until the bumper is again pushed manually to cause the disc to snap back to the first position of FIGURE 2. Tht spring 35 is arranged so that it does not exert sufficient force on the disc to return it to the position of FIGURE 1 even when the disc returns to normal ambient temperature.

The head portion provides a radial shoulder 41 which engages the side of the bridging contact 23 adjacent to the disc 13 so that the bumper is limited against movement relative to the bridging contact 23 in the direction away from the disc 13. However, the stem 36 is uniform in cross section so that the bumper is substantially unrestrained against movement relative to the bridging contact 23 in the direction toward the disc 13. Consequently on resetting of the disc the bridging contact 23 moves with the bumper only until it reaches the closed position.

In the illustrated embodiment the bridging contact 23 is provided with opposed projections 42 which extend between adjacent abutments 31 to assist in locating the bridging contacts both radially and rotationally. However, the stem 36 and the openings 37 and 38 are formed with a sufficiently close fit so that the stem is radially located with respect to the body and in turn radially locates the bridging contact 23 with respect to the body. Further, in the illustrated embodiment, the stem 36 along with the openings 37 and 38 are rectangular in shape so that the stem also functions to assist and retain the bridging contact in the proper rotational orientation. Since the stem and the cooperating openings 37 and 38 provide proper location of the bridging contact, it is not necessary in all instances to provide separate locating surfaces on the bridging contact and body.

In a normal installation the thermostat is mounted so that the terminals are enclosed within the structure of the apparatus on which the thermostat is mounted. In such installations it is normal to provide an external button actuator or the like to engage the end of the bumper for manual reset.

Although a preferred embodiment of this invention is illustrated, it is to be understood that various modifications and rearrangements of parts may be resorted to without departing from the scope of the invention disclosed.

We claim:

1. A manual reset thermostat adapted to operate in a given environmental temperature range comprising a switch body, switch means on said body providing a fixed contact, a mobile contact movable between switch opened and closed positions with respect to said fixed contact and spring means normally maintaining said mobile contact in one of said positions, a bimetallic snap disc mounted on said body providing two positions of stability, said snap disc operating to move from a first position of stability to a second position of stability upon its reaching a predetermined temperature different than said given environmental temperature range and remaining in said second position of stability when it returns to said given environmental temperature range, and a one piece unitary bumper extending between the central portion of said disc and switch means operable to move said mobile contact between opened and closed positions when said disc moves between said two positions of stability, said bumper also extending through said body and providing an accessible portion at the exterior of said thermostat, a force applied to said accessible portion operating to snap said disc from said second position to said first position.

2. A manual reset thermostat as set forth in claim 1 wherein said body and snap disc cooperate to define a generally cylindrical switch cavity closed at one end by an end wall provided by said body, said end wall and mobile contact each being formed with a centrally located axially extending opening therethrough, said bumper being formed with a stem extending through said openings with a relatively close fit whereby said stem is radially located by the opening in said end wall and in turn radially locates said movable contact with respect to said body.

3. A manual reset thermostat as set forth in claim 2 wherein said bumper is provided with a shoulder on the side of said mobile contact adjacent to said disc which engages said mobile contact and limits movement of said bumper relative to said mobile contact in a direction away from said disc to a predetermined position, said bumper and mobile contact being free of surfaces restricting relative movement therebetween from said predetermined position in the opposite direction.

4. A manual reset thermostat as set forth in claim 3 wherein said stem and openings are mating and non-circular, said stem and openings cooperating to resist rotation of said movable contact relative to said body.

5. A manual reset thermostat as set forth in claim 3 wherein said fixed contact includes a pair of contact elements extending into said cavity each provided with a radially extending portion, said radially extending portions being spaced on opposite sides of said central axis of said cavity, and said movable contact is a bridging contact extending between and engaging both of said radially extending portions when said switch means are closed.

6. A manual reset thermostat as set forth in claim 5 wherein said bridging contact is located between said end wall, said radially extending portions, and said spring means extends between said bridging contact and said end wall to normally maintain said bridging contact in engagement with said radial portions, and said stem extends through said spring means.

7. A manual reset thermostat as set forth in claim 6 wherein said switch means is closed when said snap disc is in said first position and is open when said snap disc is in said second position, and said spring means exerts insufficent force to move said snap disc to said first position when said snap disc is in said second position and is within said temperature range.

References Cited
UNITED STATES PATENTS

| | | | |
|---|---|---|---|
| 2,714,644 | 8/1955 | Harrison | 337—348 |
| 2,717,936 | 9/1955 | Bolesky | 337—343 |
| 3,014,105 | 12/1961 | Schmitt | 337—343 |
| 3,219,783 | 11/1965 | Odson | 337—348 |
| 3,258,567 | 6/1966 | Colavecchio | 337—342 |
| 3,297,845 | 1/1967 | Mertler | 337—343 |

BERNARD A. GILHEANY, Primary Examiner

R. L. COHRS, Assistant Examiner

U.S. Cl. X.R.

337—342, 343, 354